United States Patent [19]

Morese-Seguela et al.

[11] Patent Number: 5,328,734
[45] Date of Patent: Jul. 12, 1994

[54] COMPOSITION AND PROCESS FOR REDUCING THE ADHESIVE NATURE OF ETHYLENE/ALPHA-OLEFINS COPOLYMERS

[75] Inventors: Brigitte Morese-Seguela, Hinges; Urbain Coudevylle, Salome, both of France

[73] Assignee: Sofrapocommerciale, Courbevoie, France

[21] Appl. No.: 613,835

[22] PCT Filed: Mar. 30, 1990

[86] PCT No.: PCT/FR90/00225

§ 371 Date: Jan. 28, 1991

§ 102(e) Date: Jan. 28, 1991

[87] PCT Pub. No.: WO90/12064

PCT Pub. Date: Oct. 18, 1990

[30] Foreign Application Priority Data

Apr. 6, 1989 [FR] France ................................ 89 04528

[51] Int. Cl.$^5$ .................. C08L 23/08; C08L 23/16; C08L 23/10; C08J 3/12
[52] U.S. Cl. ................. 428/36.92; 524/528; 525/240; 428/402
[58] Field of Search ............... 525/240; 428/36.92

[56] References Cited

U.S. PATENT DOCUMENTS

| | | | |
|---|---|---|---|
| 4,296,022 | 10/1981 | Hudson | 525/240 |
| 4,316,825 | 2/1982 | Wirth | 525/240 |
| 4,319,004 | 3/1982 | Spielan et al. | 525/240 |
| 4,430,457 | 2/1984 | Dobreski | 525/240 |
| 4,454,092 | 6/1984 | Shimizu et al. | 525/240 |
| 4,748,206 | 5/1988 | Nogiwa et al. | 525/240 |
| 4,775,722 | 10/1988 | Kobayashi et al. | 525/194 |
| 4,833,195 | 5/1989 | Adur et al. | 525/240 |
| 4,839,228 | 6/1989 | Jezic et al. | 525/240 |

FOREIGN PATENT DOCUMENTS

| | | |
|---|---|---|
| 0037453 | 10/1981 | European Pat. Off. |
| 191990 | 8/1986 | European Pat. Off. |
| 2093589 | 1/1972 | France |
| 60-161442 | 8/1985 | Japan |

Primary Examiner—Carman J. Seccuro, Jr.
Attorney, Agent, or Firm—Finnegan, Henderson, Farabow, Garrett & Dunner

[57] ABSTRACT

The process, which makes it possible to reduce the adhesive nature of a partially crystalline copolymer (E) of ethylene and at least one alpha-olefin with a density of between 0.865 and 0.900 approximately, and to increase its resistance to crushing, consists in mixing closely said ethylene copolymer with at least one non-atactic propylene polymer (P) with a fluidity index (measured according to the ASTM D 1238 standard, condition L) between 35 and 200 dg/min. approximately, in a proportion of between 22 to 50 parts by weight approximately for 100 parts by weight of ethylene copolymer.

17 Claims, No Drawings

COMPOSITION AND PROCESS FOR REDUCING THE ADHESIVE NATURE OF ETHYLENE/ALPHA-OLEFINS COPOLYMERS

The present invention relates to a process for reducing the adhesive nature and increasing the crushing resistance of partially crystalline ethylene/alpha-olefins copolymers of very low density, and to non-tacky and crushing-resistant compositions of such copolymers and to a process for preparing the said compositions.

Copolymers of ethylene and of at least one alpha-olefin exhibit an adhesive nature which is proportionately more accentuated the higher their alpha-olefin content. In terms of density, it can be said that the adhesiveness appears when their density is lower than 0.900. Ethylene/alpha-olefins copolymers with a density lower than 0.890 are generally packaged in the form of pellets, granules, blocks or loaves. Their adhesive nature does not present any special problems when they are in the form of blocks or loaves. On the contrary, when they are packaged in the form of small-sized pellets or granules (for example approximately 1 to 5 mm) it is difficult to convey them and to store them in this state, that is to say to avoid their setting solid again after a prolonged storage period, because they exhibit a marked tendency to agglomerate, forming compact blocks. Various means which have been proposed previously to solve this type of problem in the case of various ethylenic elastomers, such as coating the surface of the granules with a silicone oil or with a non-ionic surface-active agent such as a copolymer of propylene oxide and ethylene oxide are not wholly satisfactory because, while they reduce the adhesiveness considerably at the time of the treatment, consequently permitting a substantially correct granulation, their effect decreases with time. Furthermore, granules treated with silicone oils or with copolymers of ethylene oxide and propylene oxide do not withstand crushing; after a prolonged period of storage under stress (either the weight of the granules on others in a sack, or the weight of the upper sacks on those of the first layer in storage on a pallet) it is found that the granules tend to flatten, to agglomerate and to form a compact mass which is difficult to handle.

Furthermore, Patent FR-A-2,093,589 describes mixtures of crystalline (co)polymers of alpha-monoolefins and of an amorphous ethylene-propylene or ethylene-propylene-diene rubber, the quantity of the crystalline (co)polymer being from 1 to 30 parts per 100 parts by weight of the rubber. According to the examples in this document an atactic polypropylene or a polypropylene with a melt index equal to 3 may be used as crystalline (co)polymer. The amorphous rubber employed has a Mooney viscosity of between 20 and 120.

For its part, Patent EP-A-037,453 describes a mixture comprising an ethylene-propylene polymer normally subject to flow at room temperature and under storage conditions, and a sufficient quantity (preferably up to 20% by weight of the polymer) of polypropylene to reduce the cold-flow. The ethylene-propylene polymer in question has a Mooney viscosity of 10 to 100 and contains from 40 to 60 mol % of ethylene. The chosen polypropylene preferably has a melt index of 0.5 to 30 dg/min, measured at 230° C. under 2.16 kg.

The solutions recommended by the last two documents referred to, which are suitable for elastomers which are amorphous in most cases, exhibiting a Mooney viscosity and generally having a density lower than 0.86, are not suitable for partially crystalline ethylene/alpha-olefin copolymers exhibiting no Mooney viscosity and having a density of approximately between 0.865 and 0.900. In fact, the addition of an atactic polypropylene or of an isotactic polypropylene of low melt index to these, in the recommended proportions, does not allow a significant reduction in the adhesiveness and increase the crushing resistance.

The present invention proposes to solve this problem by providing a process which, simultaneously, makes it possible to reduce the adhesive nature and to increase the crushing resistance of partially crystalline copolymers of ethylene and of alpha-olefins with a density of approximately between 0.865 and 0.900.

A first subject of the present invention consists of a process making it possible to decrease the adhesive nature and to increase the crushing resistance of a partially crystalline copolymer (E) of ethylene and of at least one alpha-olefin, having a density of approximately between 0.865 and 0.900, characterised in that it consists in intimately blending the said ethylene copolymer with at least one nonatactic propylene polymer (P) having a melt index (measured according to ASTM standard D 1238, condition L) of approximately between 35 and 200 dg/min, in a proportion ranging approximately from 22 up to 50 parts by weight per 100 parts by weight of ethylene copolymer.

The partially crystalline ethylene copolymer generally comprises approximately from 6 to 23 mol % of at least one alpha-olefin which advantageously has from 3 to 8 carbon atoms, preferably propylene or 1-butene, and preferably has a degree of crystallinity (measured by x-ray diffraction) of at least 1%. Its melt index is generally between 0.1 and 100 dg/min, preferably between 0.3 and 15 dg/min. Examples of such copolymers are especially:

the polyolefin rubbers marketed by the Mitsui company under the trademark Tafmer ®, consisting of copolymers of 78 to 92 mol % of ethylene and of 8 to 22 mol % of an alpha-olefin chosen from propylene and 1-butene, having a density of 0.860 to 0.890, having a degree of residual crystallinity of 1 to 14%, a crystalline melting temperature J of 75° C., which have an average geometric molecular weight of 60 to 120 kg/mole and a polydispersity index of between 2.2 and 2.7;

polyolefin rubbers consisting of ethylene/propylene and/or 1-butene copolymers having a melt index of approximately between 0.3 and 15 dg/min and a density of approximately between 0.865 and 0.885, comprising from 77 to 91 mol % of units derived from ethylene and from 9 to 23 mol % of units derived from propylene and/or from 1-butene, and which have a crystalline melting temperature J of approximately between 100 and 125° C. This polyolefin rubber can be subsidiarily characterised by at least one of the following features:

a polydispersity index of approximately between 3.5 and 15, preferably approximately between 4 and 8, an average geometric molecular weight (defined as shown below) of approximately between 35 and 70 kg/mole, a relationship between the density d and the content x (expressed in mol %) of units derived from propylene and from 1-butene, which is expressed by the double equation:

$$0.9084 \leq d + 0.002 \ x \leq 0.918$$

a degree of residual crystallinity (determined according to the method described below) of approximately between 3 and 15%.

The crystalline melting temperature J means the temperature determined at the maximum of the melting curve after crystallisation obtained by subjecting the copolymer sample to the following three-stage process:

melting at the rate of 8° C. per minute from 10° C. up to 150° C., then crystallisation at the rate of 8° C. per minute from 150° C. down to 10° C., then again melting at the rate of 8° C. per minute from 10° C. up to 150° C.

The degree of residual crystallinity is determined by x-ray diffraction on a copolymer sample which has been subjected to cooling at the rate of 5° C. per hour from 190° C. down to room temperature. The average geometric molecular weight is defined by the mathematical relationship:

$$\log_{10} Mg = \sum_{i=1}^{i=N} W_i \log_{10} M_i$$

where $W_i$ is the weight fraction of substance of weight $M_i$ and N is the number of fractions eluted using gel permeation chromatography. Such a polyolefin rubber can be obtained by a process consisting in copolymerrising, at a temperature approximately from 160° C. to 270° C. and at a pressure approximately from 400 to 850 bars, a gas stream containing approximately from 18 to 42% by volume of ethylene and approximately from 58% to 82% by volume of propylene and/or of 1-butene, in the presence of a catalyst system of the Ziegler type, comprising, on the one hand, at least one compound of a transition metal from groups IVB, VB, VIB and VIII of the Periodic Classification and, on the other hand, at least one organoaluminium compound and, if appropriate, in the presence of at least one chain transfer agent. The catalyst system may additionally comprise at least one aluminium or magnesium halide. To obtain the copolymers which have the characteristics described above, and in which the molar ratio ( units derived from propylene )/( units derived from 1-butene ) exceeds 0.5, the composition of the gas stream subjected to the copolymerization will be preferably such that the propylene/1-butene volume ratio exceeds approximately 0.3, depending on the nature of the catalyst system employed. In fact, the choice of the latter has an influence, known to a person skilled in the art, on the relative reactivity of ethylene, propylene and 1-butene in the copolymerization and consequently on the tendency to incorporate preferentially units derived from propylene or else units derived from 1-butene in the macromolecular chain.

A nonatactic propylene poller or copolymer (P) means according to the invention a propylene homopolymer or copolymer of advantageously isotactic structure. It has advantageously a density of approximately between 0.89 and 0.91, an isotacticity index (measured according to ISO standard 1873) of at least approximately 94% and a degree of crystallinity (measured by x-ray diffraction) of at least approximately 45%. It may be obtained by polymerisation in the presence of stereospecific catalysts of the Ziegler type, for example in suspension in a solvent or in liquid phase. For implementing the invention the polymer (P) is preferably in the form of powder or granules. Syndiotactic polypropylene may also be employed. The quantity of polymer or copolymer (P) added to the copolymer (E) is proportionately greater the lower the density (d) of the copolymer (E), or if it is desired to obtain a more pronounced effect (which may range as far as complete disappearance of the adhesiveness) for a given relative density. In order to implement the process according to the invention, this quantity is preferably such that the weight proportion (q) of polymer or copolymer (P) in the mixture obtained, expressed in %, is related to the density (d) by the relationship: $q \geq 600 - 667 \ d$. It is advantageously at least 10 parts by weight per 100 parts of copolymer (E).

An intimate blend means that the copolymer (E) forms with the polymer or copolymer (P), after the latter has been added, a homogeneous mixture in which discrete particles of each of the components cannot be discerned macroscopically. Thus, a simple mixture of granules is not suitable. One of the most suitable means for obtaining this intimate blend is melt-blending of the components followed, if need be, by granulation of the composition obtained.

A second subject of the present invention consists of a thermoplastic composition comprising, per 100 parts by weight of a partially crystalline copolymer (S) of ethylene and of at least one alpha-olefin, having a relative density of approximately between 0.865 and 0.900, approximately from 22 to 50 parts by weight of at least one nonatactic propylene polymer (P) having a melt index (measured according to ASTM standard D 1238, condition L) of approximately between 35 and 200 dg/min. The definitions of the copolymer (E) and of the polymer or copolymer (p) which are given above also apply here.

The preferred compositions are those in which the weight proportion (q) of polymer or copolymer (P), expressed in %, is related to the density (d) of the copolymer (E) by the formula:

$$q \geq 600 - 667 \ d$$

The compositions according to the invention may additionally include usual quantities of antioxidants and/or stabilisers against ultraviolet radiation, as well as, where appropriate, up to 100 parts by weight, per 100 parts of the composition, of inorganic fillers such as talc, mica, chalk, glass beads, aluminium hydroxide or of organic fillers such as sawdust. These fillers may be incorporated by usual means, such as an internal mixer.

The compositions according to the invention may be converted into films, sheets, plates, rods, profiles, hollow bodies and industrial articles obtained by injection.

They are advantageously obtained by melt-blending the constituents, for example in a kneader, an internal mixer or a single-screw or twin-screw extruder with single or twin feed and then, if appropriate, they are converted into granules. The preferred compositions referred to above then produce granules which do not exhibit any adhesive nature and which have very good crushing resistance.

Another method of preparation of the compositions according to the invention is described below.

A third subject of the present invention relates to a particular process for the preparation of the above compositions, consisting, during the continuous preparation of a copolymer (E), in introducing into the molten copolymer (E) the desired quantity of polymer or copolymer (P), also in the molten state. This introduction is possible whatever the polymerisation conditions. It can be carried out especially as part of a process operating at high pressure (300 to 3000 bars) and at high temperature (160° to 350° C.) in the presence of a catalyst system of the Ziegler type. A plant for implementing this process comprises, for example, a reactor fed with a mixture of ethylene and of comonomers by means of a primary compressor followed by a secondary compressor, a first separator operating at a pressure of approximately 250 bars in which the reaction mixture originating from the reactor is allowed to enter and is separated, on the one hand, into copolymer (E) directed towards a second separator operating at a pressure of approximately 70 bars and, on the other hand, into ethylene and comonomers which have not reacted, which are directed towards the intake of the secondary compressor. The copolymer (E) stream entering the second separator is separated therein, on the one hand, into copolymer (E) directed towards a third separator and, on the other hand, into ethylene and comonomers which have not reacted towards the intake of the primary compressor. In the third separator, also called a hopper, operating at a pressure of approximately 1 to 2 bars, the copolymer (E) is degassed and discharged towards an extruder and then a granulator.

The introduction of the polymer or copolymer (P) into the plant can take place in one of the separators, preferably the third. Advantageously, in order to ensure the homogeneity of the compositions obtained, the introduction takes place into the molten copolymer (E) stream, for example in a separator feed conduit. A twin-entry extruder whose second entry receives the polymer or copolymer (p) may also be employed as an extruder.

The following examples are intended to illustrate the invention without implying any limitations. Unless stated otherwise, the parts are expressed by weight.

The following determinations and measurements are carried out on the copolymers (E) and on the compositions obtained:

-A: adhesiveness, determined by means of a test which consists in filling with granules, to the brim, a frustoconical funnel which has a major diameter of 15 cm, a conical part 13 cm in height and an orifice diameter of 14, 18 or 25 mm, and in then measuring the time (t), expressed in seconds, taken by the granules to flow out completely. The measurement is carried out after different storage periods at room temperature, in the absence of stress (storage in plastic pouches which are kept flat).

-CR: crushing resistance, determined by means of a test which consists in arranging granules filling to the brim a cylindrical polyethylene container 11 cm in height and 12 cm in diameter. A mass of 10 kg (lead cylinder 11 cm in diameter) is then applied to the granules for a specified period (T). After the chosen time T the time (t') taken by the granules to empty the cylindrical container completely is measured, when the latter is inverted after the applied mass has been taken off.

The results of the measurements appear in the table below.

EXAMPLE 1 (COMPARATIVE)

Granules of lenticular shape (mean diameter: approximately 4 mm, mean height in the center: approximately 2 mm) of a copolymer (E) of ethylene (78 mol %) propylene (12 mol %) and 1-butene (10 mol %) having a density (measured according to ASTM standard D792) equal to 0.872 and a melt index (measured according to ASTM standard D 1238 condition E) equal to 2.6 dg/min exhibit an adhesiveness such that the said granules, subjected to the corresponding test, require a period of 150 seconds to discharge the funnel which has an orifice diameter of 25 mm, after 6 days' storage, After 15 days' storage they can no longer pass through this orifice. Their crushing resistance is practically nil: after 1 days' application of the mass employed in the corresponding test a compact block is formed, which does not flow.

EXAMPLES 2 AND 3

To the number of parts, which appears in the table below, of the copolymer (E) of Example 1 there is added, by kneading at 180° C. for a period of 6 min, the quantity which is shown in the table below of propylene homopolymer (P) having a relative density of 0.90, a melt index (measured according to ASTM standard D 1238 condition L) equal to 45 dg/min, a degree of crystallinity (measured by x-ray diffraction) equal to 65%, marketed under the name Hostalen PPW 1780.

The composition obtained is then converted into granules which have the same shape and dimensions as in Example 1.

The values obtained for the determination of the adhesiveness (A), expressed as the flow time (t) in seconds of granules from funnels which have orifice diameters of 14, 18 and 25 mm, after a storage period of 1, 6 and 15 days at room temperature, appear in the table below.

The values obtained for the determination of the crushing resistance (CR), expressed as the time (t') in seconds required by the granules to discharge the cylindrical container after inversion also appear in the table below.

TABLE

| Example | (E) | (P) | A (t) after 1 day | | | after 6 days | | | after 15 days | | | CR (t') after | | |
|---|---|---|---|---|---|---|---|---|---|---|---|---|---|---|
| | | | 14 | 18 | 25 | 14 | 18 | 25 | 14 | 18 | 25 | 1 d. | 6 d. | 15 d. |
| 1 | 100 | 0 | * | * | 100 | * | * | 150 | * | * | * | * | * | * |
| 2 | 80 | 20 | 113 | 30 | 10 | 150 | 42 | 10 | 160 | 37 | 10 | 8 | 11 | 10 |
| 3 | 70 | 30 | 90 | 25 | 9 | 155 | 35 | 10 | 155 | 30 | 9 | 3 | 10 | 10 |

*nonflowing block

We claim:

1. A process for reducing the adhesive nature and for increasing the crush resistance of granules of a partially-crystalline ethylene/alpha-olefin copolymer of ethylene and at least one alpha-olefin, said ethylene/alpha-olefin copolymer having a density between 0.865 and 0.900 g/cm$^3$ and exhibiting no Mooney viscosity, comprising forming said granules from a composition consisting essentially of an intimate ethylene polymer and propylene polymer blend consisting of said ethylene/alpha-olefin copolymer and at least one nonatactic propylene polymer having a melt index of between 35 and 200 dg/minute in a proportion of from 22 to 50 parts by weight per 100 parts by weight of said ethylene/alpha-olefin copolymer.

2. A process according to claim 1, wherein the weight percentage, q, of the propylene polymer in the blend is related to the density, d, of the ethylene/alpha-olefin copolymer as follows: $q \geq 600 - 667d$.

3. A process according to claim 2, wherein the ethylene/alpha-olefin copolymer has a degree of crystallinity of at least 1%.

4. A process according to claim 1, wherein the ethylene/alpha-olefin copolymer has a degree of crystallinity of at least 1%.

5. A process according to claim 1, wherein the blend is formed by introducing said propylene polymer in a molten state into said ethylene/alpha-olefin copolymer in a molten state during continuous preparation of the ethylene/alpha-olefin copolymer.

6. A process according to claim 1, wherein the propylene polymer is an isotactic polypropylene polymer having a relative density of between 0.89 and 0.91 g/cm$^3$, an isotacticity index of at least 94% and a degree of crystallinity of at least 45%.

7. A thermoplastic article formed from granules consisting essentially of an intimate ethylene polymer and propylene polymer blend consisting of 100 parts by weight of a partially-crystalline ethylene/alpha-olefin copolymer of ethylene and at least one alpha-olefin, said ethylene/alpha-olefin copolymer having a density between 0.865 and 0.900 g/cm3 and exhibiting no Mooney viscosity, and from 22 to 50 parts by weight of at least one nonatactic propylene polymer having a melt index of between 35 and 200 dg/minute.

8. A thermoplastic article formed from granules according to claim 7, wherein the weight percentage, q, of the propylene polymer in the granules is related to the density, d, of the ethylene/alpha-olefin copolymer as follows: $q \geq 600 - 677d$.

9. A thermoplastic article formed from granules according to claim 16 wherein the ethylene/alpha-olefin copolymer has a degree of crystallinity of at least 1%.

10. A thermoplastic article formed from granules according to claim 16 wherein the propylene polymer is an isotactic polypropylene polymer having a relative density of between 0.89 and 0.91 g/cm$^3$, an isotacticity index of at least 94% and a degree of crystallinity of at least 45%.

11. A thermoplastic article formed from granules according to claim 7 further including up to 100 parts by weight of at least one filler per 100 parts by weight of the ethylene-alpha olefin copolymer and nonatactic propylene polymer.

12. An article formed from granules according to claim 11, further including an antioxidant.

13. An article formed from granules according to claim 11, further including a stabilizer against ultraviolet radiation.

14. A thermoplastic article according to claim 7, wherein the article is in the form of a film, sheet, plate, rod, profile, or hollow body.

15. Granules consisting essentially of an intimate ethylene polymer and propylene polymer blend consisting of 100 parts by weight of a partially-crystalline ethylene/alpha-olefin copolymer having a density between 0.865 and 0.900 g/cm$^3$ and exhibits no Mooney viscosity, and 22 to 50 parts by weight of at least one nonatactic propylene polymer having a melt index of between 35 and 200 dg/minute.

16. Granules as recited in claim 15 consisting of said blend.

17. Granules produced by the process of claim 1 formed into the shape of an industrial article.

* * * * *

UNITED STATES PATENT AND TRADEMARK OFFICE
CERTIFICATE OF CORRECTION

PATENT NO. : 5,328,734
DATED : July 12, 1994
INVENTOR(S) : Brigitte Morese-Seguela and Urbain Coudevylle It is certified that error appears in the above-indentified patent and that said Letters Patent is hereby corrected as shown below:

Claim 8, column 8, line 3, change "677d" to --667d--.

Claim 9, column 8, line 5, change "claim 16" to --claim 7,--.

Claim 10, column 8, line 8, change "claim 16" to --claim 7,--.

Signed and Sealed this

Seventeenth Day of January, 1995

Attest:

BRUCE LEHMAN

*Attesting Officer*     *Commissioner of Patents and Trademarks*